(12) United States Patent
Nishikawa

(10) Patent No.: US 11,677,829 B2
(45) Date of Patent: Jun. 13, 2023

(54) DATA PROCESSING DEVICE AND DATA PROCESSING SYSTEM

(71) Applicant: RENESAS ELECTRONICS CORPORATION, Tokyo (JP)

(72) Inventor: Takuro Nishikawa, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 17/173,571

(22) Filed: Feb. 11, 2021

(65) Prior Publication Data

US 2022/0255994 A1 Aug. 11, 2022

(51) Int. Cl.
G06F 15/16 (2006.01)
H04L 67/12 (2022.01)
H04L 12/40 (2006.01)
H04L 49/90 (2022.01)

(52) U.S. Cl.
CPC ........ *H04L 67/12* (2013.01); *H04L 12/40013* (2013.01); *H04L 12/40202* (2013.01); *H04L 49/9042* (2013.01); *H04L 2012/40215* (2013.01)

(58) Field of Classification Search
CPC ............... H04L 67/12; H04L 12/40013; H04L 12/40202; H04L 49/9042; H04L 2012/40215
See application file for complete search history.

(56) References Cited

U.S. PATENT DOCUMENTS

| 11,016,926 | B1* | 5/2021 | Nasser | .................. | H04L 9/0631 |
| 2014/0366035 | A1 | 12/2014 | Yasuda | | |
| 2019/0012283 | A1* | 1/2019 | Mei | ......................... | G06F 13/28 |
| 2021/0099469 | A1* | 4/2021 | Zeh | .................... | H04L 29/12849 |

FOREIGN PATENT DOCUMENTS

| DE | 10-2014-011282 A1 | 1/2015 |
| WO | 2014/177330 A1 | 11/2014 |

OTHER PUBLICATIONS

Extended European Search Report issued in corresponding European Patent Application No. 22154796.1-1224, dated Jul. 14, 2022.

* cited by examiner

*Primary Examiner* — Normin Abedin
(74) *Attorney, Agent, or Firm* — McDermott Will & Emery LLP

(57) ABSTRACT

A data processing device includes a first CPU (Central Processing Unit), a first memory, a CAN (Controller Area Network) controller and a system bus coupled to the first CPU, the first memory and the CAN controller, wherein the CAN controller comprises a receive buffer that stores a plurality of messages each of which has a different ID, and a DMA (Direct Memory Access) controller that selects the latest message among messages having a fist ID stored in the receive buffer and transfers the selected latest message to the first memory, wherein the message is one of CAN, CAN FD and CAN XL messages.

14 Claims, 19 Drawing Sheets

FIG. 5

| | CAN ID | MESSAGE INFORMATION | PAYLOAD |
|---|---|---|---|
| ← HEAD POINTER | 101 | . . . | WATER TEMPARATURE 100 DEG. |
| | 201 | . . . | DIAGNOSIS RESULT OF ECU 2 |
| | 102 | . . . | VOLTAGE: 12V |
| | 101 | . . . | WATER TEMPERATURE 99 DEG. |
| | 202 | . . . | DIAGNOSIS RESULT OF ECU 3 |
| | 201 | | DIAGNOSIS RESULT OF ECU 4 |
| ← TAIL POINTER | | | |
| | | | |

| CAN ID | MESSAGE INFORMATION | PAYLOAD | |
|---|---|---|---|
| | CAN ID | MESSAGE INFORMATION | PAYLOAD |
| → HEAD POINTER 1 | 101 | ... | WATER TEMPARATURE 100 DEG. |
| | 102 | ... | VOLTAGE: 12V |
| | 101 | ... | WATER TEMPERATURE 99 DEG. |
| → TAIL POINTER 1 | | | |
| | | | |

305

| | CAN ID | MESSAGE INFORMATION | PAYLOAD |
|---|---|---|---|
| → HEAD POINTER 2 | 201 | ... | DIAGNOSIS RESULT OF ECU 2 |
| | 202 | ... | DIAGNOSIS RESULT OF ECU 3 |
| | 201 | | DIAGNOSIS RESULT OF ECU 4 |
| → TAIL POINTER 2 | | | |
| | | | |

| RECEIVE BUFFER | DESTINATION | TRIGGER | PROTOCOL TRANSLATION |
|---|---|---|---|
| 305 | RECEIVE BUFFER (LATEST VALUE) 200 | TIMER | CAN FD to AVTP |
| 312 | RECEIVE QUEUE 201 | ON RECEIPT | CAN FD to CAN XL |
| ⋮ | | | |

309b

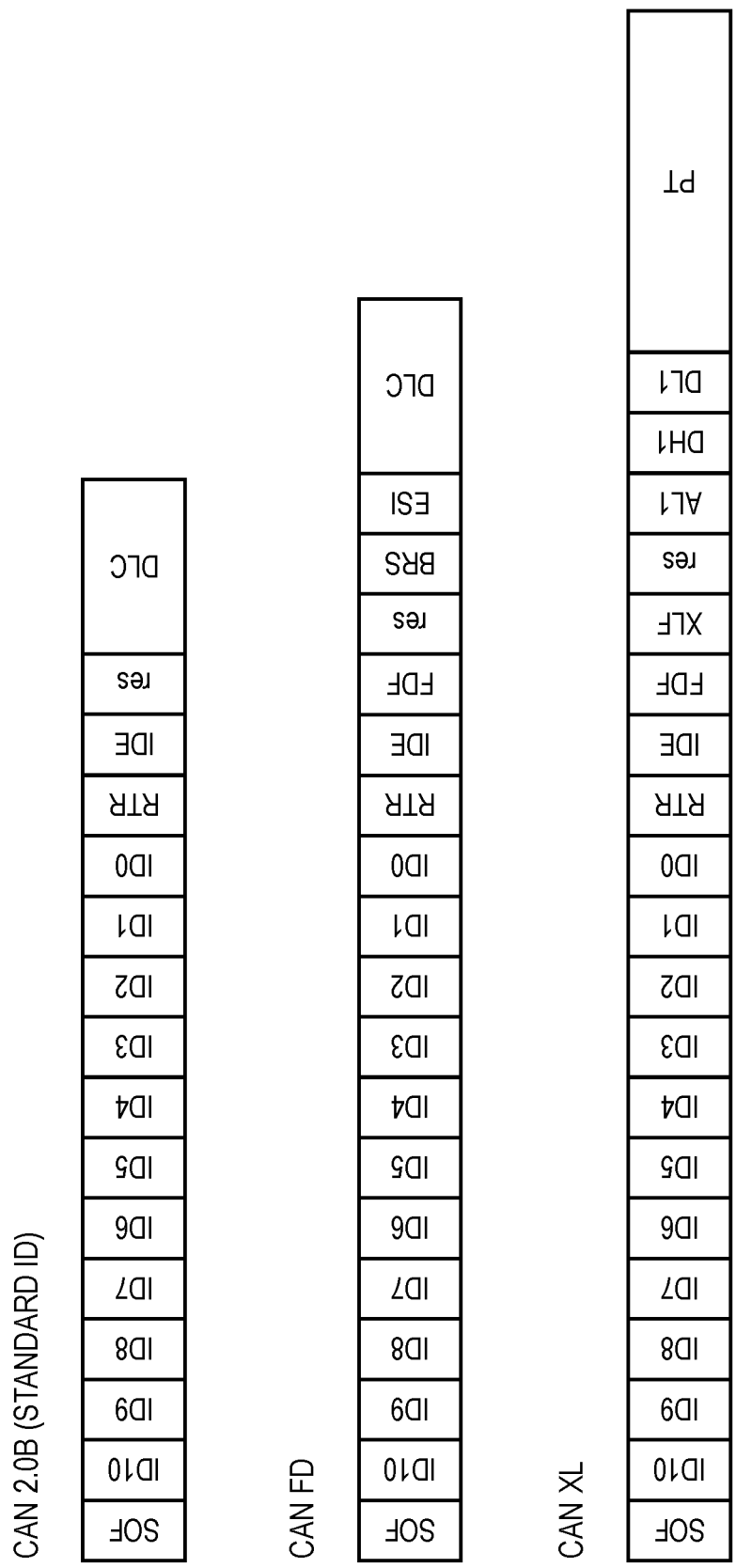

DATA PROCESSING DEVICE AND DATA PROCESSING SYSTEM

BACKGROUND

The present invention relates to a data processing device and a data processing system, and more particularly, the present invention relates to a data processing device and a data processing system incorporating automobile communication techniques.

CAN (Controller Area Network) is widely used as a communication technique for automobiles. CAN have a standard called CAN 2.0A, 2.0B, CAN FD (CAN with Flexible Data rate). A standard called CAN XL (CAN extra Large payload) is also being developed. CAN is used for connecting between ECUs (Electronic Control Unit) mounted on automobiles, and transmission and reception of sensor information (water temperature, voltage, etc.) and data processed by ECUs are carried out through CAN.

Techniques relating to CAN are disclosed in Patent Document 1. Patent Document discloses techniques of replacing a CAN FD frame with an alternative data conforming to CAN 2.0B.

PRIOR-ART DOCUMENT

Patent Document

[Patent Document 1] PCT Patent Publication No. WO2014/177330

SUMMARY

In order for the CPU to process the message received by CAN controller in the data processing device (ECU or Microcontroller) equipped with CAN controller and the CPU, the received message must be transferred to a memory area accessible by the CPU. Messages received by CAN controller include sensor information (water temperature, voltages, etc.), diagnostic results of the ECUs, software update information, etc. The sensor information is transmitted from the sensor at every predetermined timing, but the CPU does not need all the sensor information and may need only the latest value. On the other hand, in the case of the ECU diagnostic results or software update information, the CPU needs all the transmitted messages. After all received messages have been transferred to the memory area, if the CPU chooses the required message, there is a problem that CPU load and a traffic of a bus, by which the CPU, memory, and CAN controller are connected, increases.

Other objects and novel features will become apparent from the description of the specification and drawings.

A data processing device according to an embodiment includes a first CPU (Central Processing Unit), a first memory, a CAN (Controller Area Network) controller and a system bus coupled to the first CPU, the first memory and the CAN controller, wherein the CAN controller comprises a receive buffer that stores a plurality of messages each of which has a different ID, and a DMA (Direct Memory Access) controller that selects the latest message among messages having a fist ID stored in the receive buffer and transfers the selected latest message to the first memory, wherein the message is one of CAN, CAN FD and CAN XL messages.

In a data-processing device according to an embodiment, an increase in CPU load and System bus traffic can be suppressed.

BRIEF DESCRIPTION OF THE DRAWINGS

FIG. 5 is a diagram for explaining the operation of the data processing device according to first embodiment.

FIG. 14 is a diagram for explaining the operation of the data processing device according to second embodiment.

FIG. 18 is a diagram for explaining the operation of the data processing device according to fourth embodiment.

FIG. 19 is a diagram for explaining the formatting of CAN 2.0B, CAN FD and CAN XL.

DETAILED DESCRIPTION

Figure 1:
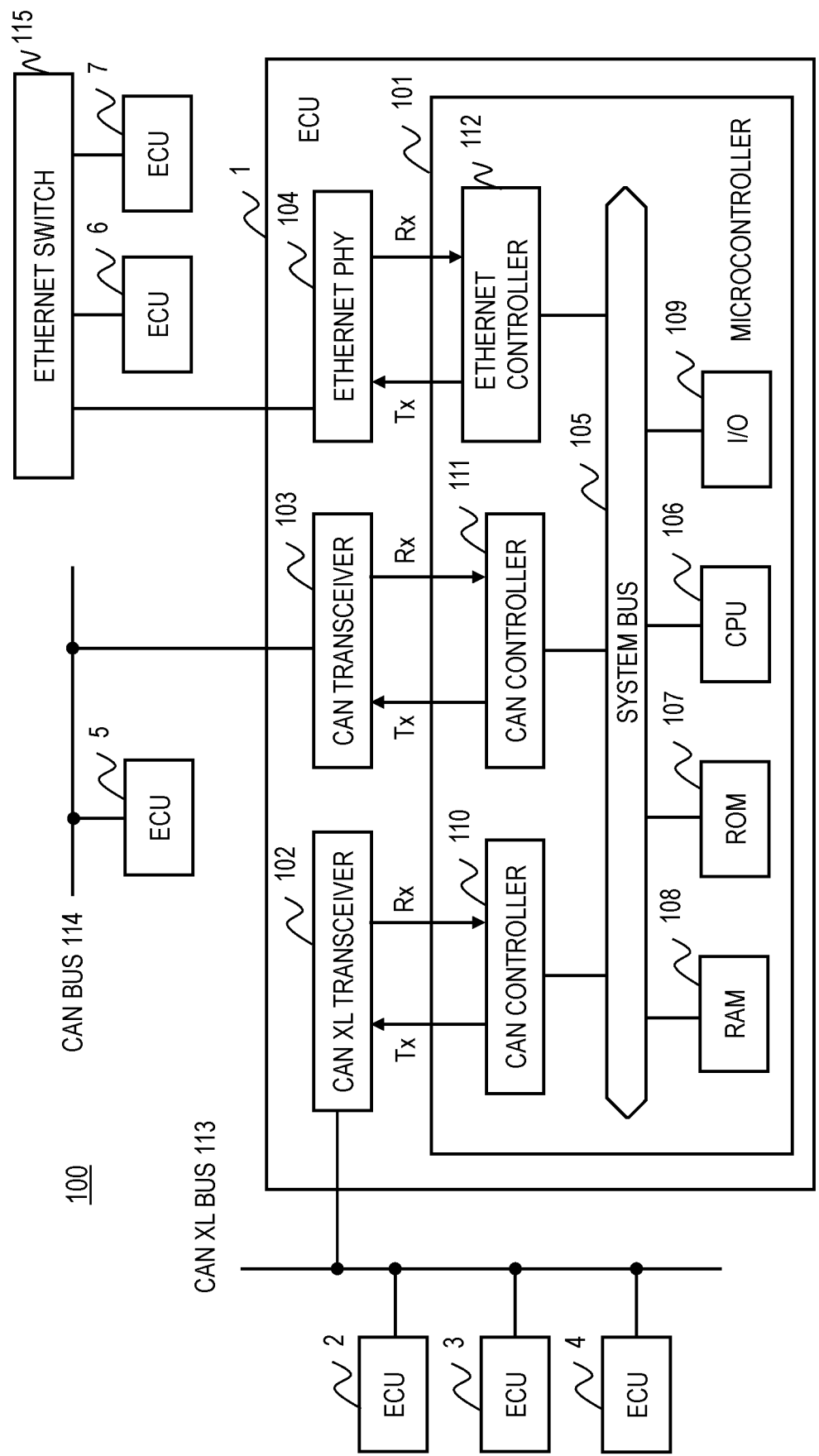
FIG. 1 is a block diagram of a data processing system according to first embodiment.

Hereinafter, a semiconductor device according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments may be arbitrarily combined with each other.

First Embodiment

FIG. 1 is a block diagram showing a configuration of a data processing system 100 according to first embodiment.

As shown in FIG. 1, data processing system 100 includes ECUs (Electronic Control Unit) 1-7, which are data processing devices. The ECUs are connected via CAN XL bus 113, CAN bus 114, Ethernet switch 115.

ECU 1 has a microcontroller 101, CAN XL transceiver 102, CAN transceiver 103, Ethernet PHY 104. Microcontroller 101 has a system bus 105, CPU 106, ROM 107, RAM 108, I/O 109, CAN controller 110, 111, and Ethernet controller 112. ECUs 2 to 7 may have the same configuration as that of ECU 1, or may have a different configuration.

CPU 106 executes a program (software) stored in ROM 107. The data required for the program execution and the data of the program execution result are stored in RAM 108. ROM 107 stores programs for processing (e.g., engine control, brake control, sensor control, and fault diagnostics) to be implemented by the ECUs.

CAN XL Transceiver 102 transmits and receives signals between CAN XL bus 113 and CAN controller 110. CAN Transceiver 103 transmits and receives signals between CAN bus 114 and CAN controller 103. Ethernet PHY 104 transmits and receives signals between Ethernet switch 115 and Ethernet controller 112.

CAN controller 110 and 111 are capable of transferring the data received through CAN XL bus 113 and CAN bus 114 to RAM 108. Further, CAN controller 110 and 111 have a function of transmitting data to CAN XL bus 113 and CAN bus 114 according to an instruction from CPU 106 or the like. Ethernet controller 112 also has a function to transmit and receive data through Ethernet switch 115.

In the first embodiment, CAN controller 110, 111, and RAM 108 are characterized. Other blocks are general and will not be described in detail. A detailed description of CAN controller 110, 111, and RAM 108 will be described below.

Figure 2:
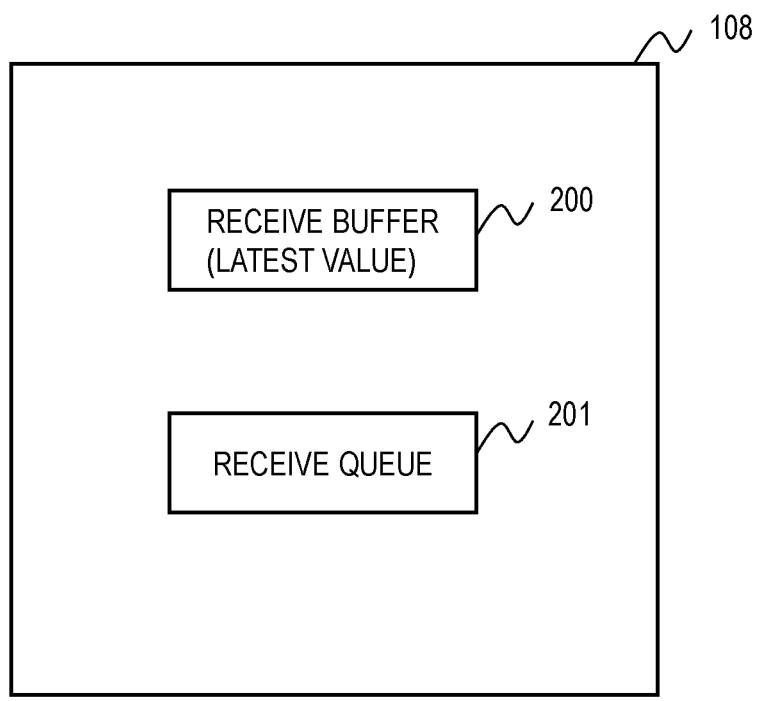
FIG. 2 is a block diagram of a RAM according to first embodiment.

FIG. 2 is a schematic diagram of RAM 108. As shown in FIG. 2, RAM 108 has a Receive buffer 200 and a Receive queue 201. Receive buffer 200 and Receive queue 201 have a predetermined addressing space. Details of these blocks will be described later.

Figure 3:
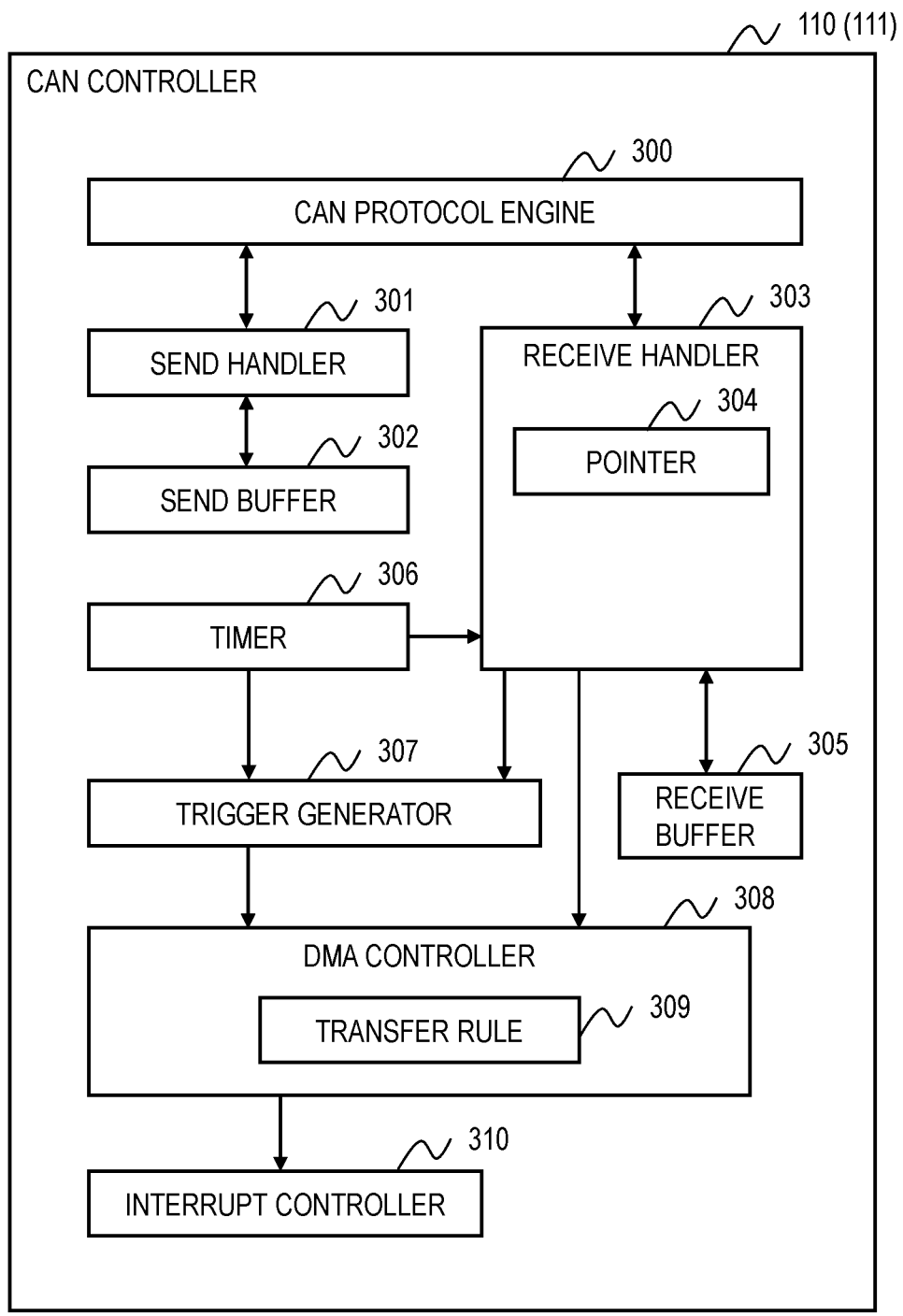
FIG. 3 is a block diagram of a CAN controller according to first embodiment.

FIG. 3 is a diagram of CAN controller 110 and 111. As shown in FIG. 3, CAN controller 110 and 111 have CAN protocol engine 300, Send handler 301, Send buffer 302, Receive handler 303, Pointer 304, Receive buffer 305, Timer 306, Trigger generator 307, DMA (Direct Memory Access) controller 308, Transfer rule 309, Interrupt controller 310.

CAN protocol engine 300, based on the CAN communication protocol, creates the data to be transmitted to CAN XL bus 113 (CAN bus 114) and interprets the received data from CAN XL bus 113 (CAN bus 114). Specifically, based on the data (stored in Send buffer 302) instructed by Send handler, CAN transmission data including message information such as CAN ID, DLC (Data Length Code), RTR (Remote Transmission Request), and Error state and payload is created. The message information and payload are extracted from the received CAN data. The extracted message information and payload are sent to Receive handler 303. In the following, the term "message" includes information such as CAN ID, DLC, and RTR and payload.

Receive handler 303 stores the received message in Receive buffer 305 based on an instruction of Pointer 304. Pointer 304 includes Head pointer and Tail pointer. Head pointer indicates an address of Receive buffer 305 in which the first message is stored at a given time. Tail pointer indicates an address of Receive buffer 305 in which the last message was stored at a predetermined time. Details will be described later.

Trigger generator 307 generates a transfer-initiation trigger signal based on Timer 306, Receive handler 303, software requests, and the like. Timer 306 measures a predetermined elapse of time.

When DMA controller 308 receives a transfer initiation trigger signal from Trigger generator 307, it transfers the data stored in Receive buffer 305 over System bus 105 to RAM 108 without CPU 106 intervention. When transferring, DMA controller 308 refers to Transfer rule 309. Transfer rule 309 is stored in a memory or a register in DMA controller. After the transfer is completed, DMA controller 308 notifies Interrupt controller 310 of the transfer completion. Details will be described later.

When Interrupt controller 310 receives a notification of transfer complete from DMA controller 308, it generates an interrupt and notifies the software (CPU 106) of transfer completion.

Figure 4:
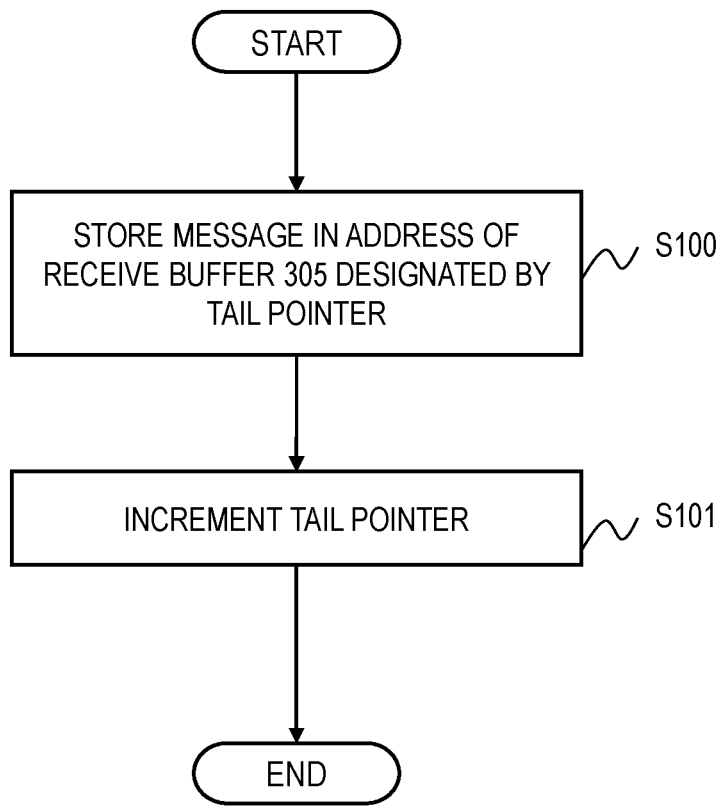
FIG. 4 is a timing chart for explaining an operation of the data processing device according to first embodiment.

Next, the specific operation of CAN controller 110 (111) will be described with reference to FIGS. 4 to 11. First, at reset (power-on), both Head pointer and Tail pointer of Pointer 304 shall be set to a start address of Receive buffer 305. FIG. 4 is a flow chart showing the operation of Receive handler 303. When Receive handler 303 receives the message, it stores the message at the address indicated by Tail pointer (step S100). After the message is stored, Tail pointer is incremented (step S101). Steps S100 and S101 are performed each time a message is received.

FIG. 5 shows, as a specific example, states of Receive buffer 305, Head pointer, Tail pointer when six messages are received in order. The address indicated by Head pointer contains the first message (CAN ID 101, water temperature 100 degrees). After the first message is stored, Tail pointer is moved down (incremented) one below Head pointer. The second message (CAN ID 201, the diagnostic result of ECU 2) is stored at the address indicated by Tail pointer, one below Head pointer. Subsequently, the third to sixth messages are stored in Receive buffer 305 as shown in FIG. 5. The message to which CAN ID 101 is assigned is a message transmitted from the water temperature sensor. The water temperature sensor transmits the water temperature information at predetermined time intervals. The message to which CAN ID 102 is assigned is a message transmitted from the voltage monitor. Like the water temperature sensor, the voltage monitor transmits a voltage value at predetermined time intervals. Each of the diagnostic results of the ECUs is generated and transmitted by the corresponding ECU.

Next, the operation of DMA controller 308 when Trigger generator 307 generates the transfer-start trigger signal will be described. Here, it is assumed that Trigger generator 307 generates the transfer start trigger signal based on the output signal of Timer 306, and Trigger generator 307 generates the transfer start trigger signal after receiving the six messages described above.

Figure 6:
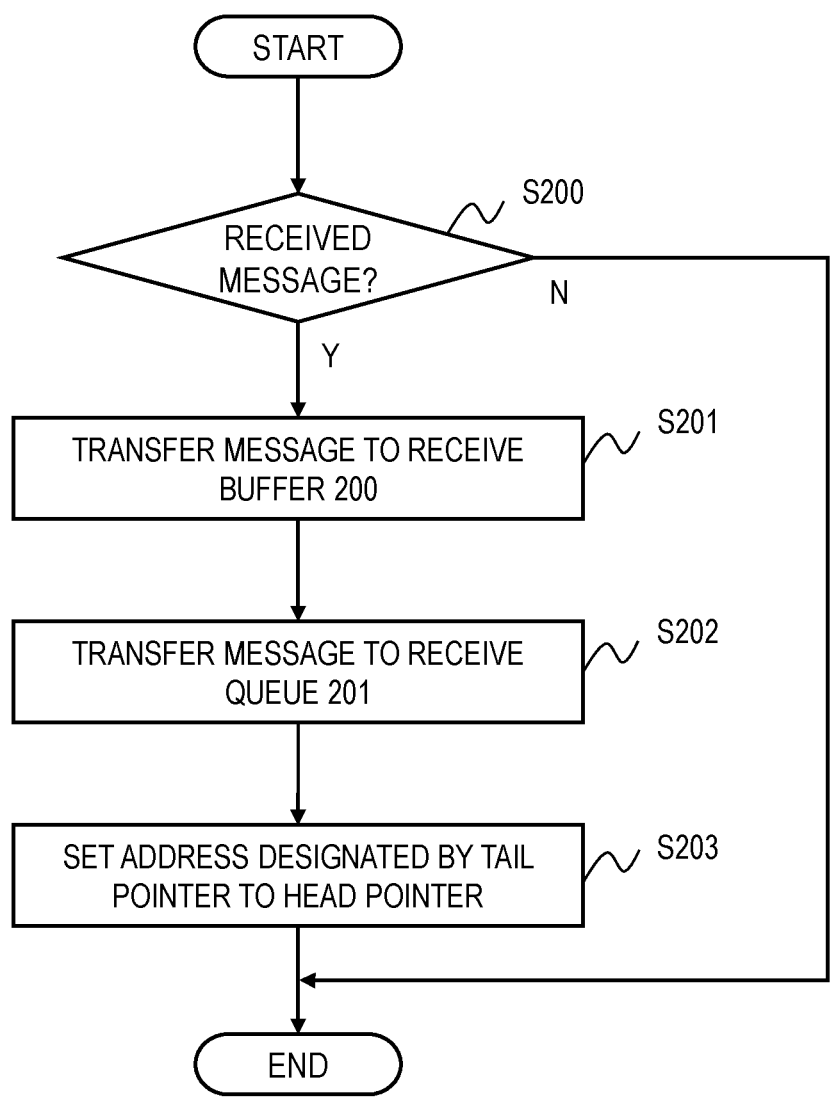
FIG. 6 is a timing chart for explaining the operation of the data processing device according to first embodiment.

FIG. 6 is a flow chart showing the operation of DMA controller 308 when the transfer-start trigger signal is received. First, DMA controller 308 checks whether there is a received message (step S200). If there is a message received, DMA controller 308 transfers the message stored in Receive buffer 305 to Receive buffer 200 (step S201). DMA controller 308 also transfers the messages stored in Receive buffer 305 to Receive queue 201 (step S202). After message transferring is complete, the address indicated by Tail pointer is set to Head pointer (step S203).

Figure 7:
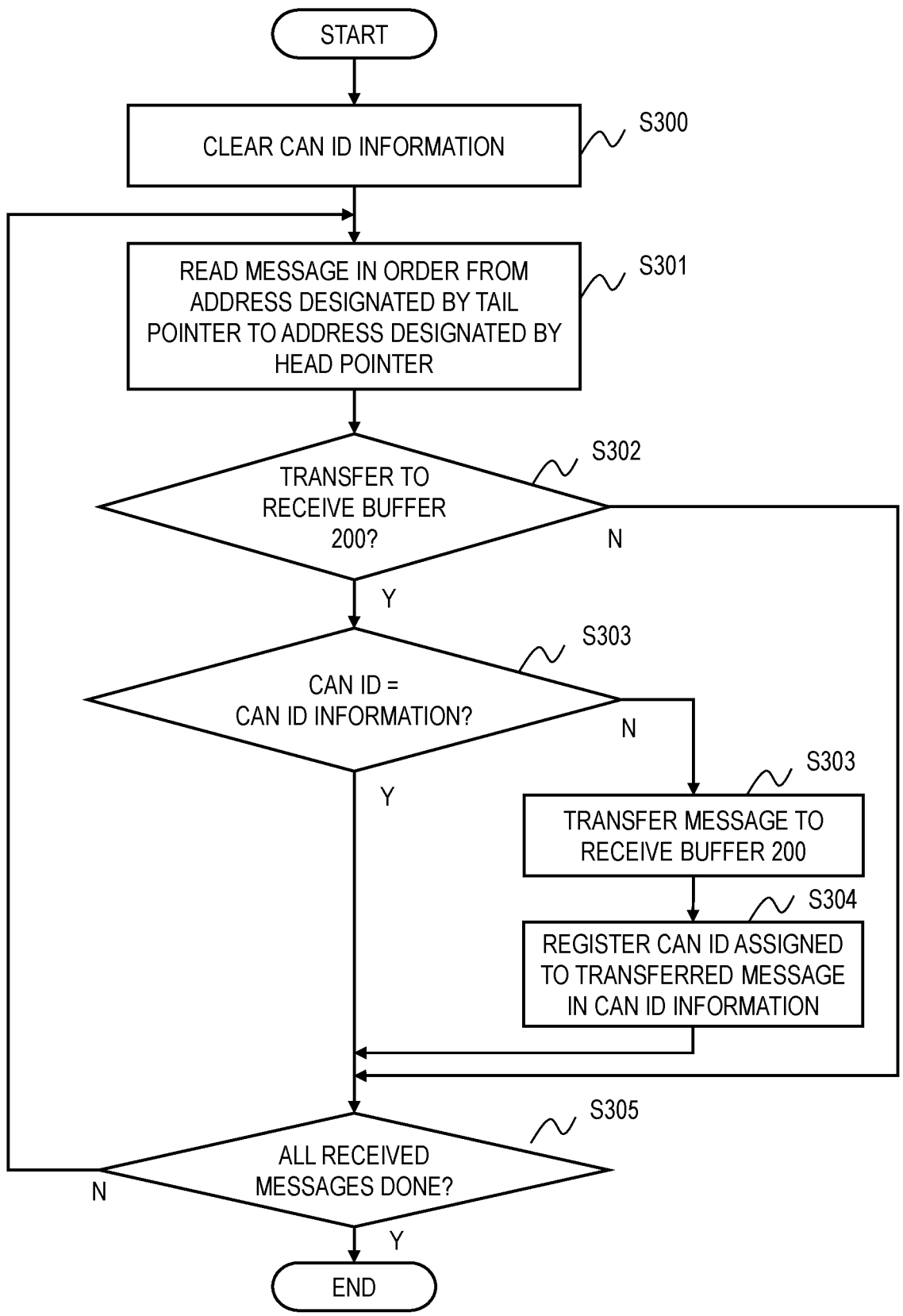
FIG. 7 is a timing chart for explaining the operation of the data processing device according to first embodiment.

FIG. 7 is a flow chart showing the detailed operation of the message transferring to Receive buffer 200 (step S201). First, CAN ID information is cleared (step S300). CAN ID information will be described later. Next, DMA controller 308 sequentially reads the messages stored in Receive buffer 305 from the address indicated by Tail pointer to the address indicated by Head pointer (step S301).

Figure 8:
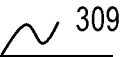
FIG. 8 is a diagram for explaining the operation of the data processing device according to first embodiment.

Next, DMA controller 308 determines whether to forward the read message to Receive buffer 200 based on Transfer rule 309 (step S302). FIG. 8 shows a specific embodiment of Transfer rule 309. As shown in FIG. 8, the transfer rule is that the messages to which CAN ID 101 and 102 are assigned are transferred to Receive buffer 200. The transfer rule is also that messages with CAN ID 201 and 202 are transferred to Receive queue 201.

Returning to FIG. 7, the operation of DMA controller 308 will be described. As described above, DMA controller 308 reads out messages in order from the addresses indicated by Tail pointer. Therefore, DMA controller 308 reads out in order from the sixth message (CAN ID 201, the diagnostic result of ECU 4). Since the fourth message (CAN ID 101, water temperature 99 degrees) is a message to be transferred to Receive buffer 200 (Y in step S302), DMA controller 308 checks whether CAN ID 101 of the fourth message is registered in CAN ID information (step S303). Since nothing is registered in CAN ID information (N in the step S303), DMA controller 308 transfers the fourth message to Receive buffer 200 (step S303) and registers CAN ID 101 in CAN ID information (step S304). DMA controller 308 then determines that the third message (CAN ID 102, voltage 12V) is to be transferred to Receive buffer 200. Since CAN ID 102 is not registered in CAN ID information, DMA controller 308 transfers the third message to Receive buffer 200 and registers CAN ID 102 in CAN ID information. DMA controller 308 then determines that the first message (CAN ID 101, water temperature 100 degrees) is to be transferred to Receive buffer 200. However, since CAN ID 101 has already been registered in CAN ID information, DMA controller 308 does not transfer the first message to Receive buffer 200 (Y in the step S303).

Figure 9:
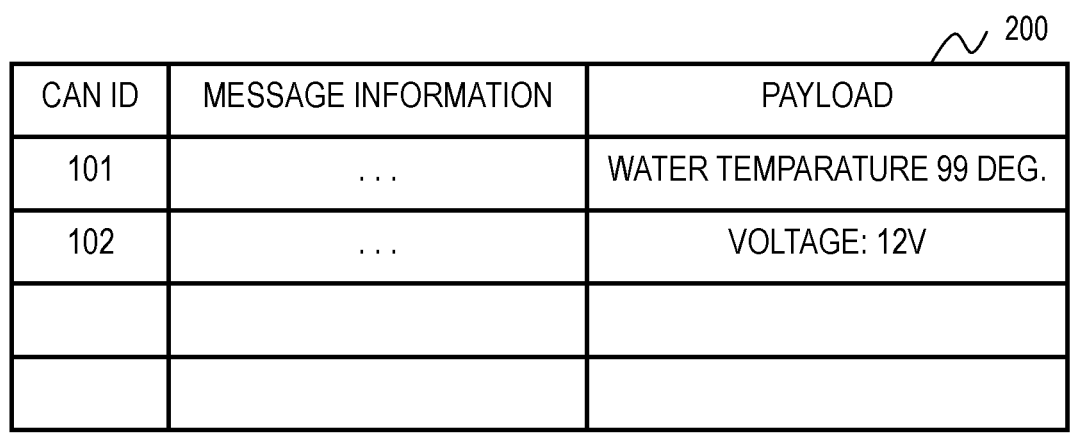
FIG. 9 is a diagram for explaining the operation of the data processing device according to first embodiment.

FIG. 9 shows the messages transferred to Receive buffer 200 as a result of the transfer described above. The fourth message and the third message are transferred to Receive buffer 200. Now we focus on the first and fourth messages. Both the first and fourth messages have the CAN ID 101 and are informational about the water temperature. However, only the fourth message is transferred to Receive buffer 200. This means that only the latest sensor information among the time-varying sensor information is transferred to Receive buffer 200. The same applies to the voltage monitor to which CAN ID 102 is applied.

Next, the message transferring to Receive queue 201 (step S202) will be described in detail.

Figure 10:
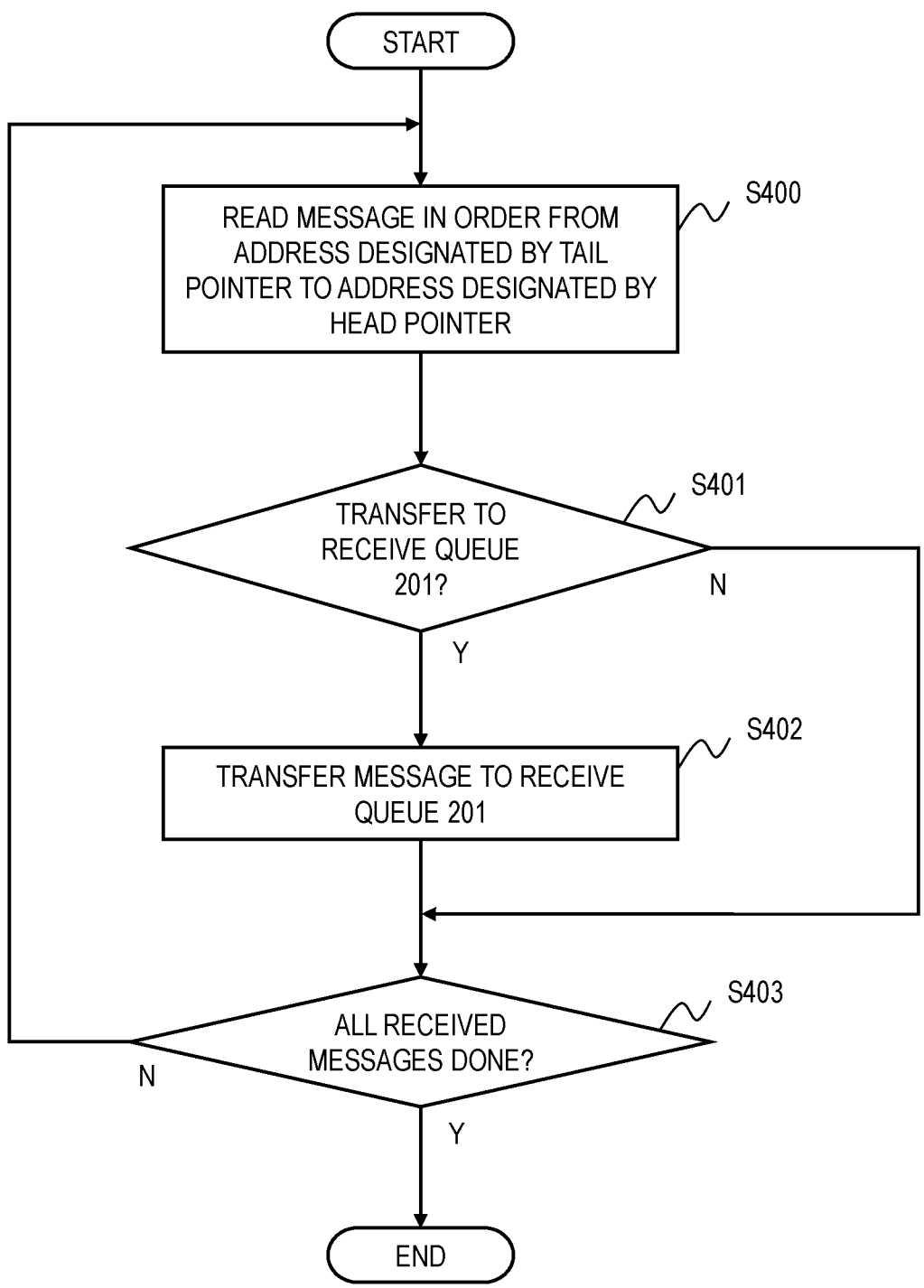
FIG. 10 is a timing chart for explaining the operation of the data processing device according to first embodiment.

FIG. 10 is a flowchart showing the operation of the transfer to Receive queue 201. DMA controller 308 sequentially reads the messages stored in Receive buffer 305 from the address indicated by Tail pointer to the address indicated by Head pointer (step S400). DMA controller 308 determines whether to transfer the read message to Receive queue 201 based on Transfer rule 309 (step S401). In FIGS. 5 and 8, DMA controller 308 transfers the sixth, fifth, and third messages to Receive queue 201 (step S402).

Figure 11:
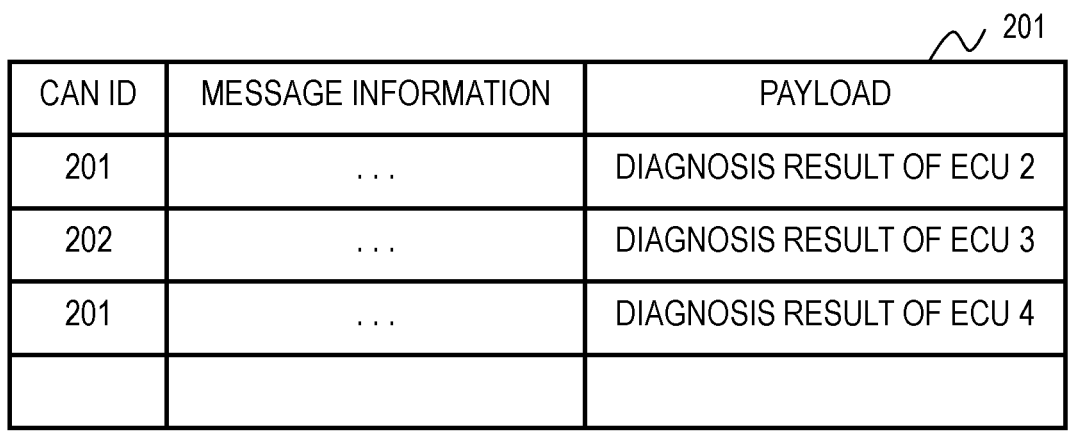
FIG. 11 is a diagram for explaining the operation of the data processing device according to first embodiment.

FIG. 11 shows messages transferred to Receive queue 201 as a result of the transfer described above. As shown in FIG. 11, all of the messages having CAN ID specified in Transfer rule are transferred to Receive queue 201. This is the difference from the messages transferred to Receive buffer 200. Since all messages are required for the diagnosis result of ECU, all received messages are transferred to Receive queue 201.

DMA controller 308 notifies Interrupt controller 310 of the completion of the transfer after the completion of the message transfer to Receive buffer 200 and Receive queue 201. When Interrupt controller 310 receives the notification of transfer complete, it generates an interrupt and notifies the software (CPU 160) of transfer completion.

The operation of the above-described DMA controller 308 is performed each time a transfer-start trigger signal is received from Trigger generator 307. Although Trigger generator 307 generates the transfer-start trigger signal based on Timer 306 output signal, but is not limited to this. The transfer start trigger signal may be generated based on the output signal of Receive handler 303. For example, when Receive handler 303 receives a predetermined number of messages, the transfer start trigger signal may be generated. Alternatively, the transfer-start trigger signal may be generated in accordance with an instruction of a software program executed by CPU 160.

As described above, based on Transfer rule 309, CAN controller 110 transfers only the latest message to Receive buffer 200 and all messages to Receive queue 201. This reduces CPU 106 workload and System bus 105 traffic.

Consider further a technique for transferring only the latest sensor information. For example, by providing a memory area (instead of Receive buffer 305) that is constantly overwritten with the sensor information each time the sensor information (water temperature, voltage, etc.) is received, only the latest sensor information can be transferred. In FIG. 5, the first message (CAN ID 101, 100 degrees water temperature) is overwritten with the fourth message (CAN ID 101, 99 degrees water temperature). If DMA controller 308 transfers the fourth message remaining in the memory area to Receive buffer 200, the same result of first embodiment will be obtained. In order to provide the memory area that is constantly overwritten with sensor data, the memory area may be divided for each CAN ID. For example, by providing the memory area dedicated to CAN ID 100, only the most recent message to which CAN ID 100 is assigned is stored in this memory area. However, in this method, the memory area must be provided for each CAN ID. In the CAN standard, CAN ID is 11 bits (standard format) or 29 bits (extended format). If the memory area is provided for each CAN ID, a large number of memory areas must be provided (an increase in memory capacity) and memory usage can be inefficient (such as unused or rarely used CAN ID). On the other hand, in the present first embodiment, such problems can be suppressed.

As described above, the data processing device (ECU) 1 according to first embodiment has CAN controller 110, and CAN controller 110 has DMA controller 308 for transferring the latest CAN message to Receive buffer 200 based on Transfer rule 309. This allows CPU 106 loads and System bus 105 traffic to be suppressed.

Second Embodiment

Figure 12:
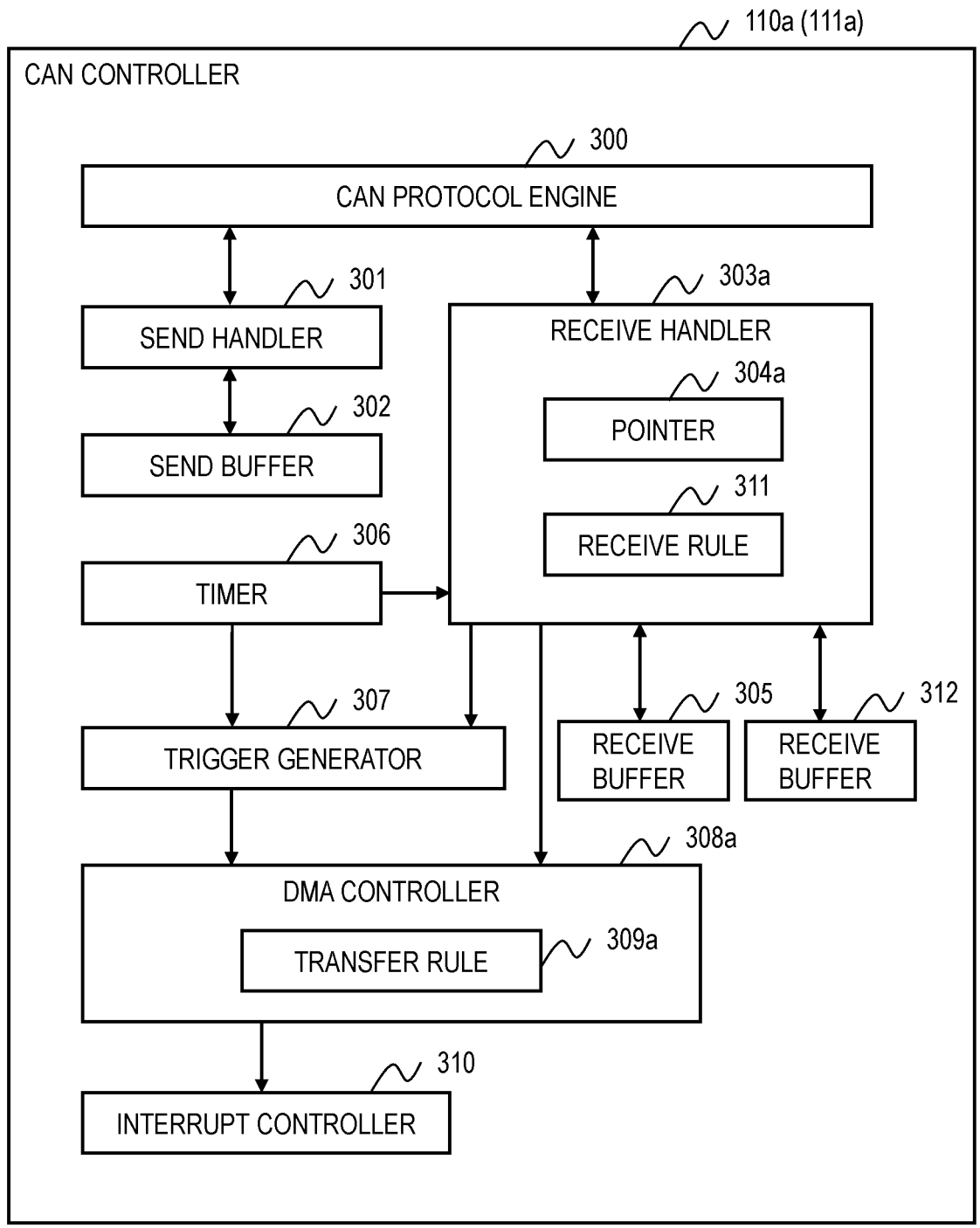
FIG. 12 is a block diagram of a CAN controller according to second embodiment.

The data processing system 100 according to second embodiment is the same as in FIG. 1. However, CAN controller 110 and 111 are replaced by CAN controller 110a and 111a. FIG. 12 is a diagram of a CAN controller 110a (111a) according to second embodiment. The difference from first embodiment is that Receive rule 311 and Receive buffer 312 are added.

Receive handler 303a stores the received message in a Receive buffer 305 or Receive buffer 312 based on instructions of Receive rule 311 and Pointer 304a. Pointer 304a has Head pointer 1 and Tail pointer 1 for Receive buffer 305 and Head pointer 2 and Tail pointer 2 for Receive buffer 312.

Figure 13:
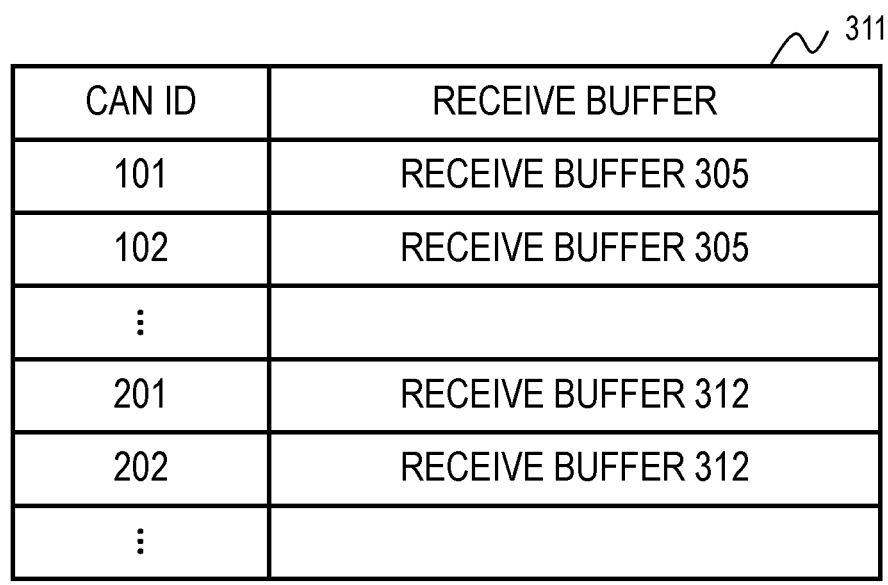
FIG. 13 is a diagram for explaining the operation of the data processing device according to second embodiment.
Figure 15:
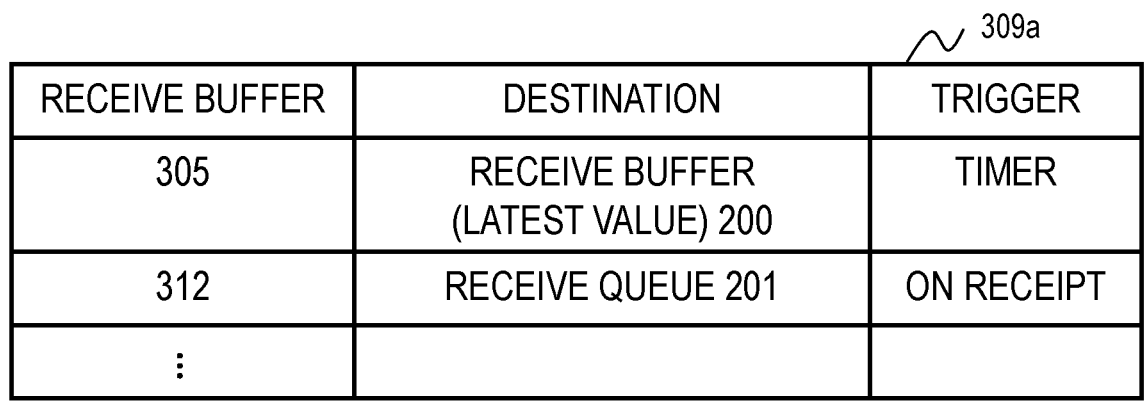
FIG. 15 is a diagram for explaining the operation of the data processing device according to second embodiment.

Next, the specific operation of CAN controller 110a (111a) will be described with reference to FIGS. 13 to 15. FIG. 13 illustrates a specific embodiment of Receive rule 311. As shown in FIG. 13, the receive rule is that messages to which CAN ID 101 and 102 are assigned are stored in Receive buffer 305. The receive rule is also that messages with CAN ID 201 and 202 are stored in Receive buffer 312. FIG. 14, like first embodiment, shows the states of Receive buffer 305, Head pointer 1, Tail pointer 1, Receive buffer 312, Head pointer 2, Tail pointer 2 when six messages are received sequentially. Note that the basic operations of Receive handler 303a, Head pointer 1, 2, Tail pointer 1, 2 are the same as those of Receive handler 303, Head pointer, Tail pointer described in first embodiment, and thus will not be described in detail.

DMA controller 308a transfers the messages stored in Receive buffer 305 and 312 to Receive buffer 200 or Receive queue 201 based on Transfer rule 309a. FIG. 15 shows a specific embodiment of Transfer rule 303a. First embodiment specifies a destination for each CAN ID, but second embodiment specifies a source (Receive buffer 305 or 312), a destination (Receive buffer 200 or Receive queue 201), and a trigger (Timer, or On receipt). As shown in FIG. 15, the messages stored in Receive buffer 305, that is, the messages to which CAN ID 101 and 102 are assigned, are transferred to Receive buffer 200 by using Timer 306 output signal as a trigger signal. Therefore, DMA controller 308a operates in the same way as first embodiment and transfers only the latest message among the messages to which CAN ID 101 is assigned to Receive buffer 200. The same applies to messages to which CAN ID 102 is assigned. On the other hand, the messages stored in Receive buffer 312, that is, the messages to which CAN ID 201 and 202 are assigned, are transferred to Receive queue 201 at the time of reception.

As a result of the above-mentioned transfer, the same message transfer as first embodiment is executed in Receive buffer 200 and Receive queue 201, as shown in FIGS. 9 and 11.

As described above, the data processing device according to the second embodiment has the same effects as those of the data processing device according to first embodiment. Moreover, since Receive buffer 305 for processing the latest message and Receive buffer 312 for processing all the messages are separated, each transfer start trigger can be divided, and efficient message transfer can be performed.

Third Embodiment

Figure 16:
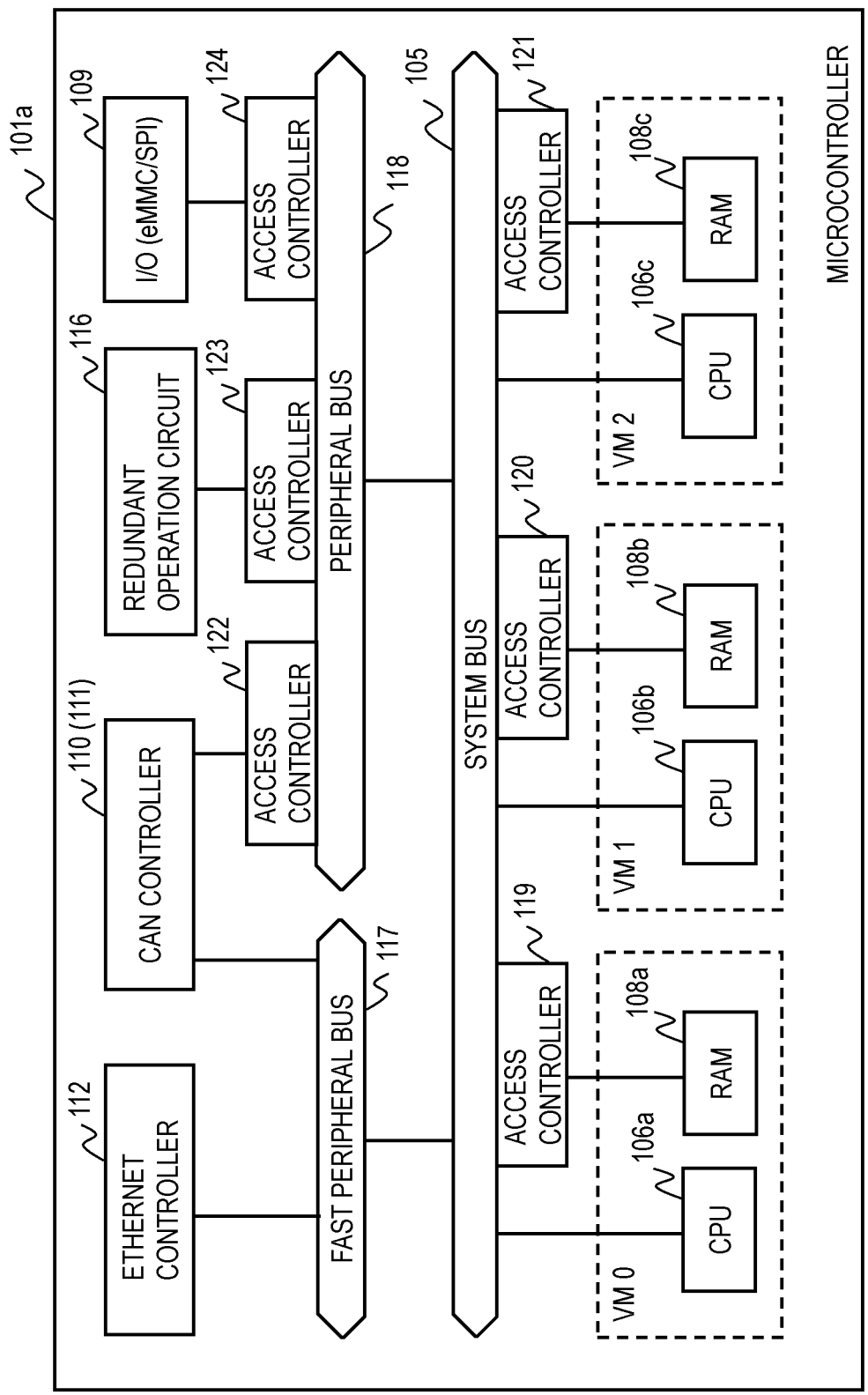
FIG. 16 is a block diagram of a microcontroller according to third embodiment.

The data processing system 100 according to third embodiment is the same as in FIG. 1. However, Microcontroller 101 is replaced by Microcontroller 101a. FIG. 16 is a block diagram of a Microcontroller 101a according to third embodiment; Differences from first embodiment are CPUs 106a, 106b, 106c, RAMs 108a, 108b, 108c, and Redundant operation circuit 116, Fast peripheral bus 117, Peripheral bus 118, Access controllers 119 to 124.

This third embodiment includes several Virtual machines (VMs) on Microcontroller 101a. CPU 106a and RAM 108a configure VM 0. CPU 106b and RAM 108b configure VM 1. CPU 106c and RAM 108c constitute a VM 2. Different operating systems run on different VMs. A Hyper visor is assigned to VM 0. Note that each VM does not comprise solely of CPU and RAM. In order to explain the features of the present third embodiment, other components such as ROM are omitted.

Access controllers 119 to 124 control accesses to resources. Each VM is required to guarantee FFT (Freedom From Interference) for each VM's independence. Access controllers 119 to 124 are control circuits for realizing the FFT. Access controller 119 determines whether access to RAM 108a is permitted or not based on the ID (bus ID) of the access source. The same applies to Access controllers 120 and 121. Access controller 122 determines whether access to CAN controller 110 is permitted or not based on the ID of the access source. Access controller 123 determines whether access to Redundant operation circuit 116 is permitted or not based on the ID of the access source. Access controller 124 determines whether access to I/O 109 is permitted or not based on the ID of the access source.

In a Microcontroller with more than one VM, one CAN message received by CAN controller 110 may be used by more than one VM. For example, the temperature data described in first and second embodiments may be used in several application programs running on a plurality of VMs. In order to cope with such a situation, CAN controller 110 (DMA controller 308) according to third embodiment has a function of transferring one CAN message to a plurality of slave circuits (RAM 108a to 108c, Ethernet controller 112, Redundant operation circuit 116, I/O 109). Specifically, DMA controller 308 transfers a message with an ID permitted by Access controller corresponding to a destination slave of the message. For example, assume that one CAN message (e.g., CAN ID 101, water temperature 99 degrees) is transferred to VM 1 and VM 2. Bus IDs permitted by Access controller 119 are X and Z. Bus IDs permitted by Access controller 120 are Y and Z. In this situation, DMA controller 308 can simultaneously transfer a CAN message to VM 1 and VM 2 by transferring the CAN message with the bus ID set to Z to System bus 105. The CAN message reception by CAN controller 110 is the same as that of first and second embodiments. Therefore, a description thereof will be omitted.

Another way to transfer one CAN message to more than one VM is to use Hyper visor. In this case, DMA controller 308 transfers the message for VM 1 and VM 2 to Hyper visor (VM 0). Hyper visor then transfers the received message to VM 1 and to VM 2 two times. However, in this situation, CPU 106a is overloaded, and a latency for completion of the transfer is degraded. On the other hand, in third embodiment, since DMA controller 308 can transfer a message to a plurality of VMs at a time, such problems can be suppressed.

Here, Redundant operation circuit 116 will be further explained. Redundant operation circuit 116 is a circuit for calculating redundancy codes such as CRC (Cyclic Redundancy Check) and CMAC (Cipher-based Message Authentication Code). CRC and CMAC may be assigned to CAN communication messages in order to increase the security of communication. When CAN controller 110 receives a CAN message with CRC or CMAC, it forwards the CAN message with CRC or CMAC to Redundant operation circuit 116. Redundant operation circuit 116 performs CRC and CMAC operations on the basis of the transferred message, and sends the operation result to CAN controller 110. CAN controller 110 can determine the correctness and security of the received CAN message based on the received operation result.

As described above, CAN controller 110 (DMA controller 308) can forward one CAN message to a plurality of slaves. For example, assume that a CAN message with CRC is transferred to VM 1. Bus IDs permitted by Access controller 123 are X and Y. In this situation, DMA controller 308 can transfer the CAN message with the CRC to VM 1 and Redundant operation circuit 116 by transferring the CAN message with the CRC with the bus ID as X to System bus 105 and Peripheral bus 118. Redundant operation circuit 116 calculators the CRC based on the transferred message and sends the computed result to CAN controller 110. CAN controller 110 determines the correctness of the CAN message with CRC based on the received operation result. That is, CAN controller 110 can check CRC of the received CAN message while transferring the received CAN message with CRC to VM 1. CRC operation can be performed by the destination VM 1 (CPU 106*b*), but in this case, the CPU load and the processing time increase. In third embodiment, such problems can be suppressed.

Finally, I/O 109 will be described. For example, assuming that an external Flash memory is connected to I/O 109. Communication logs may be stored in the external Flash memory. CAN controller 110 can then transmit the communication log to the Flash memory via I/O 109 while forwarding the CAN message to Ethernet via Ethernet controller.

As described above, the data processing device according to third embodiment has the same effects as those of the data processing first and second embodiments. Further, since CAN controller 110 transfers one CAN message to a plurality of slaves, an increase of the processing time associated with the transfer can be suppressed.

Fourth Embodiment

Figure 17:
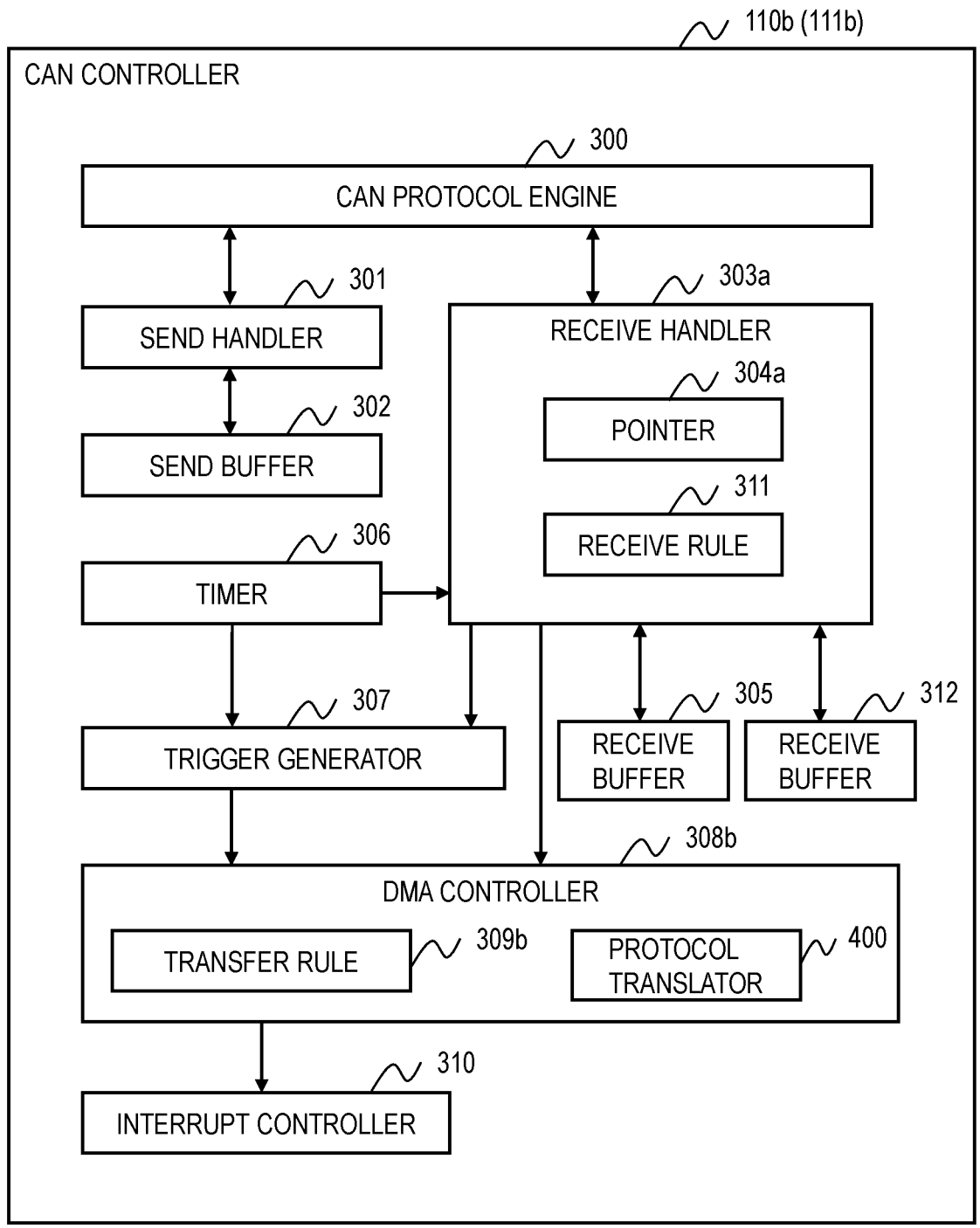
FIG. 17 is a block diagram of a CAN controller according to fourth embodiment.

The data processing system 100 according to fourth embodiment is the same as in FIG. 1. However, CAN controllers 110 and 111 are replaced by CAN controllers 110*b* and 111*b*. FIG. 17 is a block diagram of CAN controller 110*b* (111*b*) according to fourth embodiment. A difference from first and second embodiments is DMA controller 308*b*. DMA controller 308*b* has a Protocol translator 400.

Protocol translator 400 is used to convert communication protocols. Protocol translator 400 can convert between CAN, CAN FD, CAN XL, AVTP (Audio Video Transport Protocol. Standard in IEEE1722) protocols. For protocol conversion, the corresponding bits between CAN, CAN FD, CAN XL, AVTP protocols may be determined in advance.

The basic operation of CAN controller 110*b* (111*b*) is the same as that of first and second embodiments. However, the operation of DMA controller 308*b* differs from first and second embodiments. Based on Transfer rule 309*b*, DMA controller 308*b* translates the received CAN message into the designated protocol and forwards the translated message to Receive buffer 200 or Receive queue 201.

FIG. 18 shows a specific embodiment of Transfer rule 309*b*. As shown in FIG. 18, CAN FD message stored in Receive buffer 305 is converted to AVTP format by Protocol translator 400, and the converted message is transferred to Receive buffer 200. CAN FD message stored in Receive buffer 312 is converted to CAN XL format by Protocol translator 400, and the converted message is transferred to Receive queue 201. Since the reception and transmission of CAN/CAN FD/CAN XL messages other than protocol conversion are the same as those of second embodiment, detailed information will be omitted.

FIG. 19 shows respective formats of CAN 2.0B (standard ID), CAN FD and CAN XL. CAN protocol engine 300 determines the respective formats. Specifically, the distinction between CAN 2.0B and CAN FD is determined by whether the FDF-bit is Dominant (CAN) or Recessive (CAN FD). The distinction between CAN FD and CAN XL is determined by whether the FDF bit is followed by the res bit or the XLF bit. The decision is sent to Receive handler 303*a* and DMA controller and is used during protocol-translation.

AVTP format is used to transmit small-sized payloads received in CAN 2.0B or CAN FD (and possibly CAN XL) on a Ethernet or CAN XL capable of communicating larger-sized payloads. This can be accomplished by concatenating several small sized payloads into a AVTP formatted payload and embedding AVTP formatted payload into Ethernet or CAN XL format.

When executing the protocol conversion described above in CPU 106, the CPU load increases. Moreover, when multiple payloads are concatenated by CPU, System bus 105 traffic increases because multiple payloads must be transferred from DMA controller 308*b* to RAM 108 over System bus 105. This fourth embodiment can suppress the increase in CPU-load and System bus traffic.

As described above, in the data processing device according to present fourth embodiment, the same effects as those of the data processing first and second embodiments can be obtained. Further, since the protocol conversion is performed inside CAN controller, it is possible to suppress the increase in the CPU load and System bus traffic associated with the protocol conversion.

It should be noted that the present invention is not limited to the above-mentioned embodiments, and various modifications can be made without departing from the gist thereof.

What is claimed is:

1. A data processing device comprising:
    a first CPU (Central Processing Unit);
    a first memory;
    a CAN (Controller Area Network) controller; and
    a system bus coupled to the first CPU, the first memory and the CAN controller,
    wherein the CAN controller comprises:
    a receive buffer that stores a plurality of messages each of which has a different ID; and
    a DMA (Direct Memory Access) controller that selects the latest message among messages having a first ID stored in the receive buffer and transfers the selected latest message to the first memory without an intervention of the first CPU, and
    wherein the message is one of CAN, CAN FD and CAN XL messages,
    wherein the DMA controller transfers a message having a second ID stored in the receive buffer to the first memory,
    wherein the first memory has a first memory area and a second memory area,
    wherein the latest message having the first ID is transferred to the first memory area and the message having the second ID is transferred to the second memory area,
    wherein the CAN controller further includes a head pointer and a tail pointer,
    wherein the plurality of messages is stored in a reception order from a start address of the receive buffer indicated by the head pointer to an end address of the receive buffer indicated by the end pointer, and
    wherein the DMA controller selects the latest message by searching a message having the first ID from the tail pointer toward the head pointer.

2. The data processing device according to claim 1,
    wherein the tail pointer is incremented each time a message is received, and
    wherein the head pointer is changed to an address indicated by the tail pointer after completion of transfer by the DMA controller.

3. The data processing device according to claim 1, wherein the receive buffer includes a third memory area in which the message having the first ID is stored and a fourth memory area in which the message having the second ID is stored.

4. The data processing device according to claim 1,
    wherein the CAN controller further comprises a trigger generator, and
    wherein the DMA controller performs the transfers based on an instruction of the trigger generator.

5. The data processing device according to claim 1, further comprising:
a slave circuit;
a first access controller that controls an access to the first memory; and
a second access controller that controls an access to the slave circuit,
wherein the DMA controller generates a transfer message to which the first and second access controllers allow access when transferring the latest message.

6. The data processing device according to claim 5, wherein the slave circuit is one of a second memory, a redundant operation circuit and an I/O.

7. The data processing device according to claim 5, further comprising:
a second CPU,
wherein the slave circuit is a second memory, and
wherein a virtual machine comprises the first and second CPUs and the first and second memories.

8. The data processing device according to claim 1,
wherein the DMA controller further comprises a protocol converter, and
wherein the protocol converter converts a received message into one of CAN FD, CAN XL and AVTP formats.

9. A data processing system, comprising:
a first data processing device;
a second data processing device; and
a bus coupled to the first and second data processing devices,
wherein the first data processing device comprises:
a first CPU (Central Processing Unit);
a first memory;
a CAN (Controller Area Network) controller; and
a system bus coupled to the first CPU, the first memory and the CAN controller,
wherein the CAN controller comprises:
a receive buffer that stores a plurality of messages each of which has a different ID; and
a DMA (Direct Memory Access) controller that selects the latest message among messages having a first ID stored in the receive buffer and transfers the selected latest message to the first memory without an intervention of the first CPU,
wherein the message is one of CAN, CAN FD and CAN XL messages,
wherein the bus is one of CAN, CAN FD and CAN XL busses,
wherein the DMA controller transfers a message having a second ID stored in the receive buffer to the first memory,
wherein the first memory has a first memory area and a second memory area,
wherein the latest message having the first ID is transferred to the first memory area and the message having the second ID is transferred to the second memory area,
wherein the CAN controller further includes a head pointer and a tail pointer,
wherein the plurality of messages is stored in a reception order from a start address of the receive buffer indicated by the head pointer to an end address of the receive buffer indicated by the end pointer, and
wherein the DMA controller selects the latest message by searching a message having the first ID from the tail pointer toward the head pointer.

10. The data processing system according to claim 9, wherein the receive buffer includes a third memory area in which the message having the first ID is stored and a fourth memory area in which the message having the second ID is stored.

11. The data processing system according to claim 9, further comprising:
a slave circuit;
a first access controller that controls an access to the first memory; and
a second access controller that controls an access to the slave circuit,
wherein the DMA controller generates a transfer message to which the first and second access controllers allow access when transferring the latest message.

12. The data processing system according to claim 11, wherein the slave circuit is one of a second memory, a redundant operation circuit and an I/O.

13. The data processing system according to claim 11, further comprising:
a second CPU,
wherein the slave circuit is a second memory, and
wherein a virtual machine comprises the first and second CPUs and the first and second memories.

14. The data processing system according to claim 9,
wherein the DMA controller further comprises a protocol converter, and
wherein the protocol converter converts a received message into one of CAN FD, CAN XL and AVTP formats.

* * * * *